United States Patent
Sekine et al.

(10) Patent No.: US 12,214,278 B2
(45) Date of Patent: Feb. 4, 2025

(54) NON-TRANSITORY COMPUTER READABLE MEDIUM, INFORMATION PROCESSING METHOD, AND GAME DEVICE FOR IMPLEMENTING GAME ACTIONS USING DIFFERENT INPUT OPERATIONS FOR A GAME CONTROLLER

(71) Applicant: CYGAMES, INC., Tokyo (JP)

(72) Inventors: Kazutoshi Sekine, Kanagawa (JP); Robert Chase LaCas, Kanagawa (JP)

(73) Assignee: CYGAMES, INC., Tokyo (JP)

( * ) Notice: Subject to any disclaimer, the term of this patent is extended or adjusted under 35 U.S.C. 154(b) by 321 days.

(21) Appl. No.: 17/538,343

(22) Filed: Nov. 30, 2021

(65) Prior Publication Data

US 2022/0088475 A1 Mar. 24, 2022

Related U.S. Application Data

(63) Continuation of application No. PCT/JP2020/018933, filed on May 12, 2020.

(30) Foreign Application Priority Data

May 30, 2019 (JP) ................................. 2019-101842

(51) Int. Cl.
*A63F 13/42* (2014.01)
*A63F 13/45* (2014.01)
(Continued)

(52) U.S. Cl.
CPC .............. *A63F 13/42* (2014.09); *A63F 13/45* (2014.09); *A63F 13/5375* (2014.09); *A63F 13/58* (2014.09); *A63F 13/67* (2014.09)

(58) Field of Classification Search
CPC ...... A63F 13/42; A63F 13/45; A63F 13/5375; A63F 13/58; A63F 13/67; A63F 13/422; A63F 13/833
See application file for complete search history.

(56) References Cited

U.S. PATENT DOCUMENTS

| | | | |
|---|---|---|---|
| 6,764,401 | B1 | 7/2004 | Akatsuka |
| 2021/0031107 | A1* | 2/2021 | Takahashi ............... A63F 13/45 |
| 2021/0322881 | A1* | 10/2021 | Tago ..................... A63F 13/577 |

FOREIGN PATENT DOCUMENTS

| | | |
|---|---|---|
| JP | 2001-046742 A | 2/2001 |
| JP | 3839354 B2 | 11/2006 |
| JP | 2011-239936 A | 12/2011 |

OTHER PUBLICATIONS

International Search Report for corresponding International Application No. PCT/JP2020/018933, mailed Jul. 7, 2020 (7 pages).

(Continued)

*Primary Examiner* — Omkar A Deodhar
*Assistant Examiner* — Shauna-Kay Hall
(74) *Attorney, Agent, or Firm* — Osha Bergman Watanabe & Burton LLP

(57) ABSTRACT

A non-transitory computer readable medium stores a program causing a computer to execute: determining an operation that is input from an operating section; causing a target object to execute a particular action both in the case where it is determined that a first operation is input and in the case where it is determined that a second operation that differs from the first operation is input; and causing the degree of disadvantage or the degree of advantage after the end of the particular action to differ between the case where the particular action is executed as a result of the first operation being input and the case where the particular action is executed as a result of the second operation being input.

10 Claims, 12 Drawing Sheets

(51) Int. Cl.
     *A63F 13/5375*    (2014.01)
     *A63F 13/58*       (2014.01)
     *A63F 13/67*       (2014.01)

(56) References Cited

OTHER PUBLICATIONS

Written Opinion for corresponding International Application No. PCT/JP2020/018933, mailed Jul. 7, 2020 (2 pages).
Blazblue Chronophantasma; "Gekkan arukadia (Monthly Arcadia)"; Arcade Video Game Machine Magazine, No. 152, pp. 002-020; Nov. 30, 2012 (24 pages).
Office Action in counterpart Japanese Patent Application No. 2019-101842 issued on Aug. 20, 2019 (6 pages).

* cited by examiner

FIG.6

| ACTION TYPE | STRENGTH | OPERATION TYPE | |
|---|---|---|---|
| | | SIMPLE OPERATION | NORMAL OPERATION |
| FIRST ABILITY ACTION | WEAK | 60F | 20F |
| | INTER-MEDIATE | 70F | 20F |
| | STRONG | 600F | 480F |
| SECOND ABILITY ACTION | WEAK | 80F | 25F |
| | INTER-MEDIATE | 100F | 30F |
| | STRONG | 600F | 480F |
| NORMAL SPECIAL ACTION | — | 600F | 480F |
| LIMIT SPECIAL ACTION | — | 600F | 480F |

FIG.7

NON-TRANSITORY COMPUTER READABLE MEDIUM, INFORMATION PROCESSING METHOD, AND GAME DEVICE FOR IMPLEMENTING GAME ACTIONS USING DIFFERENT INPUT OPERATIONS FOR A GAME CONTROLLER

CROSS REFERENCE TO RELATED APPLICATIONS

This application is a continuation application of International Application No. PCT/JP2020/018933, filed on May 12, 2020, which claims priority to Japanese Patent Application No. 2019-101842, filed on May 30, 2019, the entire contents of which are incorporated by reference herein.

BACKGROUND ART

Technical Field

The present invention relates to information processing programs, information processing methods, and game devices.

As described in, for example, PTL 1, there are well-known battle games in which a player character and an opponent character combat against each other. In this battle game, the player can make the player character invoke a killer technique by inputting a predetermined operation to an operating section.

CITATION LIST

Patent Literature

Patent Literature 1: JP 3839354 B

SUMMARY OF INVENTION

Technical Problem

If a difficult operation is required to invoke a killer technique, beginners have difficulty in using the killer technique and are thus discouraged from playing the game. On the other hand, if an operation for invoking a killer technique is easy, the technical gap among players becomes small, also discouraging players from playing the game.

An object of the present invention is to provide an information processing program, an information processing method, and a game device capable of enhancing the desire to play a game.

Solution to Problem

In order to solve the above-described problem, an information processing program causes a computer to function as: an operation determination unit for determining an operation that is input from an operating section; an action control unit capable of causing a target object to execute a particular action both in the case where it is determined that a first operation is input and in the case where it is determined that a second operation that differs from the first operation is input; and a state management unit for causing the degree of disadvantage or the degree of advantage after the end of the particular action to differ between the case where the particular action is executed as a result of the first operation being input and the case where the particular action is executed as a result of the second operation being input.

In addition, the action control unit can execute the particular action in the case where it is determined that the first operation or the second operation is input in a permitted state, and the state management unit may change a state from the permitted state to a restricted state in the case where the particular action is executed and may change the state from the restricted state to the permitted state in the case where a first change condition is satisfied in the restricted state after the particular action is executed as a result of the first operation being input and in the case where a second change condition, which is satisfied more easily or earlier than the first change condition, is satisfied in the restricted state after the particular action is executed as a result of the second operation being input.

In addition, the state management unit may change the state to the permitted state by determining that the first change condition is satisfied when a first time elapses in the restricted state and may change the state to the permitted state by determining that the second change condition is satisfied when a second time that is shorter than the first time elapses in the restricted state.

In addition, the first operation may be smaller than the second operation in either one or both of the number of operating sections that need to be operated and the total number of operations that need to be executed.

In addition, the information processing program may cause the computer to function further as a notification image display unit for displaying a notification image that suggests or indicates the first operation among the first operation and the second operation.

In order to solve the above-described problem, an information processing method includes: a step for determining an operation that is input from an operating section; a step capable of causing a target object to execute a particular action in the case where it is determined that a first operation is input or in the case where it is determined that a second operation that differs from the first operation is input; and a step for causing the degree of disadvantage or the degree of advantage after the end of the particular action to differ between the case where the particular action is executed as a result of the first operation being input and the case where the particular action is executed as a result of the second operation being input.

In order to solve the above-described problem, a game device includes: an operation determination unit for determining an operation that is input from an operating section; an action control unit capable of causing a target object to execute a particular action in the case where it is determined that a first operation is input or in the case where it is determined that a second operation that differs from the first operation is input; and a state management unit for causing the degree of disadvantage or the degree of advantage after the end of the particular action to differ between the case where the particular action is executed as a result of the first operation being input and the case where the particular action is executed as a result of the second operation being input.

Effects of Disclosure

According to the present invention, the desire to play a game can be enhanced.

BRIEF DESCRIPTION OF DRAWINGS

FIG. 6 is a second diagram for illustrating examples of the simple operation and the normal operation.

FIG. 7 is a diagram for illustrating examples of restriction times.

DESCRIPTION OF EMBODIMENTS

An aspect of an embodiment of the present invention will be described below in detail with reference to the accompanying drawings. The dimensions, materials, other specific values, etc. given in this embodiment are merely examples for facilitating understanding, and do not limit the present invention unless otherwise specifically mentioned. In this description and the drawings, the same reference signs are attached to elements having substantially the same functions and configurations, omitting repeated descriptions thereof, and elements that are not directly related to the present invention are not shown.

(Entire Configuration of Information Processing System S)

Figure 1:
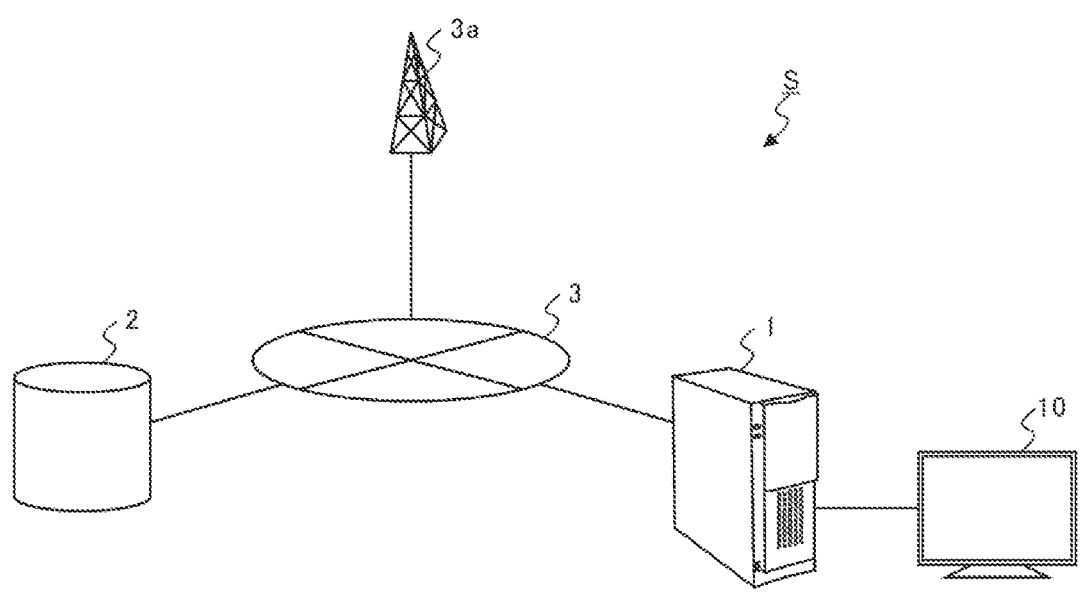
FIG. 1 is an illustration showing a schematic configuration of an information processing system.

FIG. 1 is an illustration showing a schematic configuration of an information processing system S. The information processing system S is what is called a client-server system including a game device 1, a server 2, and a communication network 3 having a communication base station 3a.

The game device 1 realizes a so-called battle game. Although a case where a 2D battle game is provided by the game device 1 is described here, the game to be provided may be a 3D battle game. In addition, this embodiment enables a battle among a plurality of players offline (offline battle), a battle among players online (online battle), and a battle between a player and a computer offline (computer battle). Although two players can play combat against each other here in an offline battle and an online battle, three or more players may be able to combat against one another.

Examples of the game device 1 include a special game appliance for playing the game, a mobile phone such as a smartphone, a tablet, and a personal computer. This embodiment will be described in the context of the case where the game device 1 is implemented by a special game device. The game device 1 can be connected to a display 10 via a communication cable, and displays a game screen on the display 10.

Note that the game device 1 can establish communication with the server 2 via the communication network 3. It should be noted, however, that the game device 1 need not necessarily have a communication function. Furthermore, although the display 10 is provided separately from the game device 1, the display 10 may be included in the game device 1.

The server 2 is communicatively connected to a plurality of game devices 1. The server 2 accumulates various kinds of information for each player who plays the game. Furthermore, the server 2 updates the accumulated information on the basis of operations input from the game devices 1.

The communication base station 3a is connected to the communication network 3, and sends information to and receives information from the game devices 1 in a wireless manner. The communication network 3 is implemented by a mobile phone network, the Internet network, a local area network (LAN), a special circuit, or the like, and realizes wireless or wired communication connection between the game devices 1 and the server 2.

(Hardware Configuration of Game Device 1)

Figure 2:
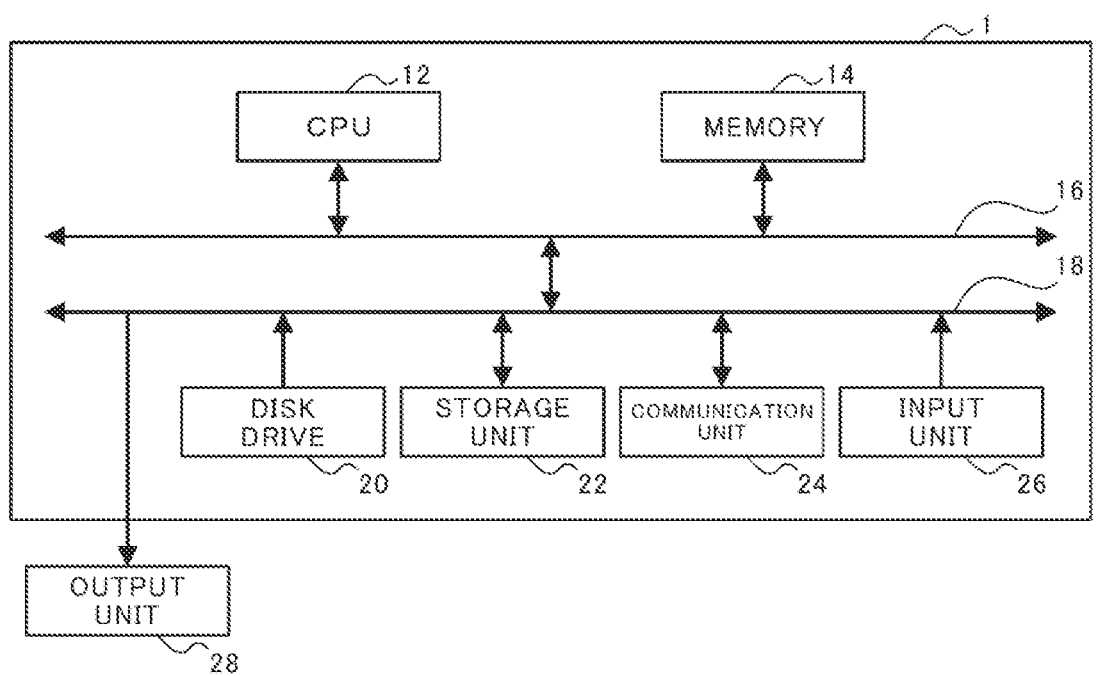
FIG. 2 is a diagram for illustrating the hardware configuration of a game device.

FIG. 2 is a diagram for illustrating the hardware configuration of the game device 1. As shown in FIG. 2, the game device 1 is configured to include a central processing unit (CPU) 12, a memory 14, a bus 16, an input/output interface 18, a disk drive 20, a storage unit 22, a communication unit 24, and an input unit 26.

The CPU 12 runs a program stored in the memory 14 to control the progress of the game. The memory 14 is configured of a read only memory (ROM) or a random access memory (RAM), and stores the program and various kinds of data needed for controlling the progress of the game. The memory 14 is connected to the CPU 12 via the bus 16.

The input/output interface 18 is connected to the bus 16. The disk drive 20, the storage unit 22, the communication unit 24, and the input unit 26 are connected to the input/output interface 18.

The disk drive 20 reads a storage medium in which a game program is stored. The storage unit 22 is configured of a semiconductor memory such as a dynamic random access memory (DRAM), and stores various kinds of programs and data. In the game device 1, programs and data stored in the storage medium inserted into the disk drive 20 or stored in the storage unit 22 are loaded into the memory 14 (RAM) by the CPU 12.

The communication unit 24 is communicatively connected to the communication base station 3a in a wireless manner, and sends information to and receives information from the server 2 via the communication network 3, such as various kinds of data and programs. In the game device 1, programs, etc. received from the server 2 can be stored in the memory 14 or the storage unit 22.

The input unit 26 is configured of a unit via which player's operations are input (operations are accepted), such as an analog controller, a touchscreen, buttons, a keyboard, or a mouse. Furthermore, the input unit 26 may be configured of an acceleration sensor that detects tilting or movement or a microphone that detects the player's voice. That is, the input unit 26 includes a wide variety of devices that enable the input of the player's intents in distinguishable manners. Here, a controller 50, which will be described later, is provided as the input unit 26.

Furthermore, an output unit 28 configured of the display 10 described above, a speaker, etc. is connected to the input/output interface 18. Although descriptions here assume that the game device 1 does not include the output unit 28, the game device 1 may be configured to include the output unit 28.

(Game Specifics)

Next, the specifics of the game provided by the game device (information processing system S) according to this embodiment will be described by using an example. Note that although an offline battle, an online battle, and a computer battle can be played with the game device 1 as described above, game specifics will be described by using an offline battle here.

Figure 3A:
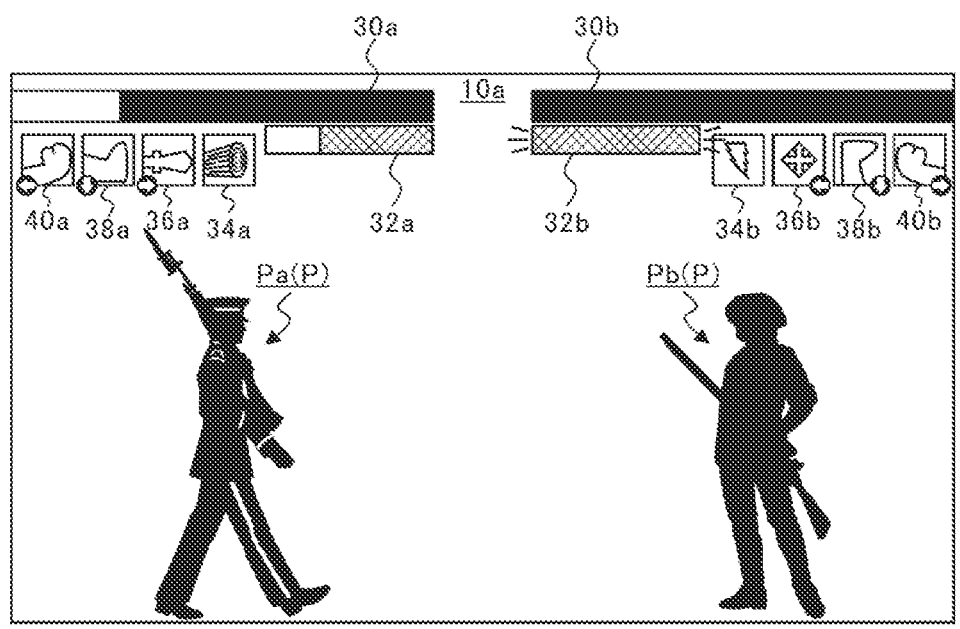
FIG. 3A is a diagram for illustrating game specifics.

FIG. 3A is a diagram for illustrating game specifics. In a game of this embodiment, a plurality of characters that can be selected by a player are provided. Although not described in detail, a player first determines any one character as an object to be operated. Hereinafter, one of two players is referred to as a first player, and the other as a second player. In addition, a character serving as an object to be operated by the first player is denoted as a player character Pa, and a character serving as an object to be operated by the second player is denoted as a player character Pb. Note that the player characters Pa and Pb are collectively denoted as the player characters P (target objects).

In addition, hereinafter, when a player character P operated by a player himself/herself is to be indicated from the player's point of view, the player character P is referred to as the player's own character, and a character serving as the opponent of the player's own character is referred to as the opponent character. When the first player and the second player have determined the player characters Pa and Pb, respectively, as described above, a battle game is started.

In the battle game, the player character Pa is displayed on the left side of the game screen 10a of the display 10, and the player character Pb is displayed on the right side of the game screen 10a. The player characters P execute various actions through operations executed by the players. Actions of the player characters P include move actions, attack actions, defensive actions, special actions, and ability actions.

Move actions include changes in the posture of the player characters P, such as jump up actions and crouch down actions, in addition to the left and right movement (walking) of the player characters P.

Attack actions are actions for attacking the opponent character, and defensive actions are actions for defending the player's own character against an attack from the opponent character. A plurality of types of attack actions are provided, and a collision range, damage inflicted on the opponent character, etc. are set for each type of attack action. Note that attack actions are set for each character, and some attack actions are common among a plurality of characters, and other attack actions are inherent to individual characters. If the opponent character is included in the collision range when an attack action is executed, it is possible to inflict damage on the opponent character (hit the opponent character with the attack). It should be noted, however, that even though the opponent character is included in the collision range, the opponent character may suffer no damage (the opponent character may not be hit with the attack) as long as the opponent character takes an appropriate defensive action.

The player characters P have set therein a physical power value (HP). When the opponent character is hit with an attack, the physical power value of the opponent character decreases. In the battle game, a player who has first decreased the physical power value of the opponent character to 0 wins. In the upper section of the game screen 10a, an HP indication bar 30a indicating the physical power value of the player character Pa, as well as an HP indication bar 30b indicating the physical power value of the player character Pb, is displayed.

Each of the HP indication bars 30a and 30b visually indicates the ratio of the current physical power value (remaining physical power value) with respect to the maximum value of the physical power value. At the time the battle game is started, each of the physical power values is set as the maximum value. In FIG. 3A, the black-painted portion of the display region of each of the HP indication bars 30a and 30b corresponds to the remaining physical power value, and this black-painted portion decreases as the physical power value decreases.

Special actions are actions for advantageously proceeding with the battle game. Special actions include, for example, a special attack action capable of inflicting more severe damage on the opponent character than the above-described attack actions. This special attack action is set for each character and takes a longer period of time to complete than the normal attack actions. In other words, the special attack action is displayed in more dynamic animation than the normal attack actions.

Note that the special attack action is described as the special actions here, but the special actions are not limited to the special attack action. For example, an action for placing the opponent character into a disadvantageous state (disadvantageous state) over a certain time period, placing the player's own character into an advantageous state (advantageous state) over a certain time period, or the like may be provided as a special action.

The disadvantageous state includes, for example, a stiffened state in which some or all actions are disabled, an attack power down state in which damage inflicted on the opponent character is decreased, and a defensive power down state in which damage inflicted by the opponent character is increased. In addition, the advantageous state includes, for example, an attack power up state in which damage inflicted on the opponent character is increased and a defensive power up state in which damage inflicted by the opponent character is decreased.

The players cannot always invoke a special action but can invoke a special action only in a situation in which predetermined invocation conditions are satisfied. Here, invocation points are updated for each of the player characters P during the battle game, and it is possible to invoke the special actions only in a situation in which the invocation points reach the maximum value.

The invocation points are suggested to the players in the form of special meters 32a and 32b. The special meters 32a and 32b visually indicate the ratios of the current values with respect to the maximum values of the invocation points of the player characters Pa and Pb, respectively. In FIG. 3A, the current values of the invocation points are shown with cross-hatching. When the invocation points reach the maximum values, the special meters 32a and 32b are highlighted, such as blinking, thus indicating that the special actions can be invoked.

The invocation points are added to according to a predetermined addition condition and are reset when a special action is invoked. The addition condition can be set, as appropriate. However, the addition condition set here is that the player characters P execute a predetermined action. Examples of the predetermined action include some or all of move actions, attack actions, wait actions, and ability actions of the player characters P. The invocation points are added to each time the player characters P execute various types of actions.

Note that, regarding the additional value to the invocation points, different values may be set for different actions, or a common value may be set for all actions. Furthermore, a predetermined time elapsing, inflicting predetermined damage on the opponent character, the player's own character suffering predetermined damage, etc., may be set as addition conditions in addition to, or in place of, the above-described addition conditions.

Here, in this embodiment, a normal special action and a limit special action are provided as the special actions. More specifically, the special actions are executed when a player executes a predetermined operation in a situation in which the invocation points reach the maximum value, and when the physical power value at the time the predetermined operation is input is 30% or more of the maximum value, only the normal special action can be executed. On the other hand, when the physical power value is less than 30% of the maximum value, the normal special action and the limit special action can be selectively executed.

Although the player's operation differs for the normal special action and the limit special action, the invocation points are shared by both actions. In addition, the limit special action brings about a greater effect than the normal special action. It should be noted, however, that the normal special action and the limit special action may have an operation in common, so that the normal special action and the limit special action can be automatically switched between according to the physical power value at the time the operation is input.

Ability actions, similarly to the above-described special actions, are actions for advantageously proceeding with the battle game and are set for each character. Each character has three or four types of ability actions set therefor, and the player can execute each of the ability actions during the battle game. Although it is assumed here that ability actions work to inflict damage on the opponent character, ability actions may work, for example, to place the opponent character into a disadvantageous state or place the player's own character into an advantageous state. In addition, it is also assumed that the ability actions work to bring about a smaller effect than the special actions, but the ability actions may work to bring about an effect equal to or greater than that of the special actions.

As shown in FIG. 3A, a notification image corresponding to each of the ability actions is displayed on the game screen 10a. In this embodiment, a first notification image 34a, a second notification image 36a, a third notification image 38a, and a fourth notification image 40a are displayed as notification images corresponding to the ability actions of the player character Pa. In addition, a first notification image 34b, a second notification image 36b, a third notification image 38b, and a fourth notification image 40b are displayed as notification images corresponding to the ability actions of the player character Pb.

In the example shown in FIG. 3A, each of the player characters Pa and Pb can execute a first ability action, a second ability action, a third ability action, and a fourth ability action. Each of the first notification images 34a and 34b corresponds to the first ability action. Similarly, the second notification images 36a and 36b, the third notification images 38a and 38b, and the fourth notification images 40a and 40b correspond to the second ability actions, the third ability actions, and the fourth ability actions, respectively.

As is also obvious from FIG. 3A, the first ability actions and the second ability actions differ between the player character Pa and the player character Pb, and the third ability actions and the fourth ability actions are the same for the player character Pa and the player character Pb. In this manner, the above-described notification images are configured to evoke specifics of the corresponding ability actions.

Here, a restriction time is set on each of the ability actions, and once an ability action is executed, the ability action cannot be executed again until the restriction time elapses. Each of the notification images notifies the player of whether the system is in a state in which the ability action is executable (hereinafter, referred to as a permitted state) or in a state in which the ability action is not executable (hereinafter, referred to as a restricted state).

Figure 3B:
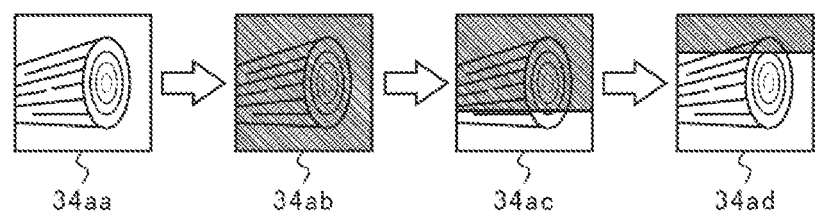
FIG. 3B is a diagram for illustrating an example of a notification image.

FIG. 3B is a diagram for illustrating an example of a notification image. In the case where the system is in a permitted state in which the first ability action is executable, a first notification image 34aa at the leftmost side in FIG. 3B is displayed. In this state (illuminated state), the player can clearly identify the pattern marked on the first notification image 34aa. On the other hand, when the first ability action is executed, the entire image is darkened as is the first notification image 34ab, making it difficult for the player to identify the pattern. Thereafter, the darkened portion moves up as time elapses, as are a first notification image 34ac and a first notification image 34ad, and the first notification image 34aa is displayed again when the restriction time elapses. In short, the illuminated state without a darkened portion indicates the permitted state, and a state with a darkened portion indicates the restricted state. In addition, the occupancy of the darkened portion suggests the time left until the system comes into the permitted state.

Furthermore, each of the above-described notification images suggests or indicates an operation for executing the corresponding ability action. More specifically, two types of operations, a simple operation (first operation) and a normal operation (second operation) different from each other, are associated with each of the ability actions. In other words, whether the player inputs the simple operation or the normal operation for an ability action, the same ability action can be executed. At this time, the effect of the ability action is the same, whichever operation is input. It should be noted, however, that the effect of an ability action may differ depending on the input operation.

The simple operation is set such that the player can input it more easily than the normal operation and constitutes a so-called beginner intended operation. Each of the notification images suggests or indicates the simple operation among the simple operation and the normal operation. The operation for executing each of the ability actions will be described in detail below. Note that left and right for the operation for executing the ability actions are reversed between the first player and the second player. Here, the operation will be described by way of an example where the first player causes the player character Pa to execute ability actions.

Figure 4:
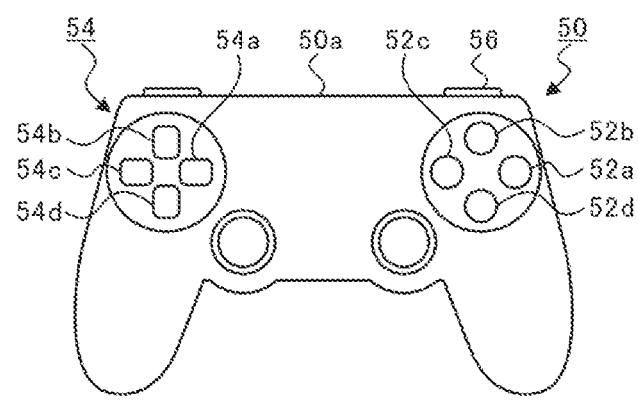
FIG. 4 is a diagram for illustrating an example of a controller.

FIG. 4 is a diagram for illustrating an example of the controller 50. The controller 50 is communicatively connected to the input/output interface 18 in a wireless or wired manner. The controller 50 includes a body section 50a. The body section 50a is configured in a shape that allows the player to grip the body section 50a with both of his/her hands. In addition, the body section 50a includes a plurality of operating sections for accepting the player's operation. Here, some of the operating sections provided on the controller 50 will be described.

On the right side of the body section 50a, a first button 52a, a second button 52b, a third button 52c, and a fourth button 52d are provided. The first button 52a is an operating section for mainly accepting an attack operation, and when only the first button 52a is pressed, the player characters P execute an attack action. When only the first button 52a is pressed, the player characters P execute the attack action of brandishing a sword, delivering a punch, etc. Note that specifics of the attack actions differ for each of the player characters P.

The second button 52b and the third button 52c also accept an attack operation in the same manner as the first button 52a. When only the second button 52b or the third button 52c is pressed, an attack action is executed in the same manner as when the first button 52a is pressed. It should be noted, however, that the first button 52a, the second button 52b, and the third button 52c have different levels of damage inflicted on the opponent character, i.e., different strengths of attack, when the opponent character is hit with an attack. The strength of attack is highest with the first button 52a, and the strength of attack is lowest with the third button 52c. It should be noted, however, that the order of the speed of attack is reversed such that the speed of attack is lowest with the first button 52a and the speed of attack is highest with the third button 52c.

In addition, the body section 50a includes a direction instruction section 54. The direction instruction section 54 includes a right button 54a, an upper button 54b, a left button 54c, and a lower button 54d. The direction instruction section 54 accepts an instruction on the direction of each of the actions of the player characters P. The right button 54a accepts the rightward direction on the screen as an operation direction, the upper button 54b accepts the upward direction on the screen as an operation direction, the left button 54c accepts the leftward direction on the screen as an operation direction, and the lower button 54d accepts the downward direction on the screen as an operation direction. In the case where any one of the buttons in the direction instruction section 54 is operated alone, the player characters P execute a move action in the corresponding operation direction. In addition, for example, when an attack operation is executed in a state in which a button in the direction instruction section 54 is pressed, the attack action is executed in the corresponding operation direction.

Furthermore, a simple button 56 is provided on an upper surface of the body section 50a. The simple button 56 mainly accepts the simple operation for the ability actions.

Figure 5:
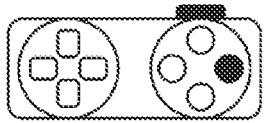
FIG. 5 is a first diagram for illustrating examples of a simple operation and a normal operation.
Figure 6:
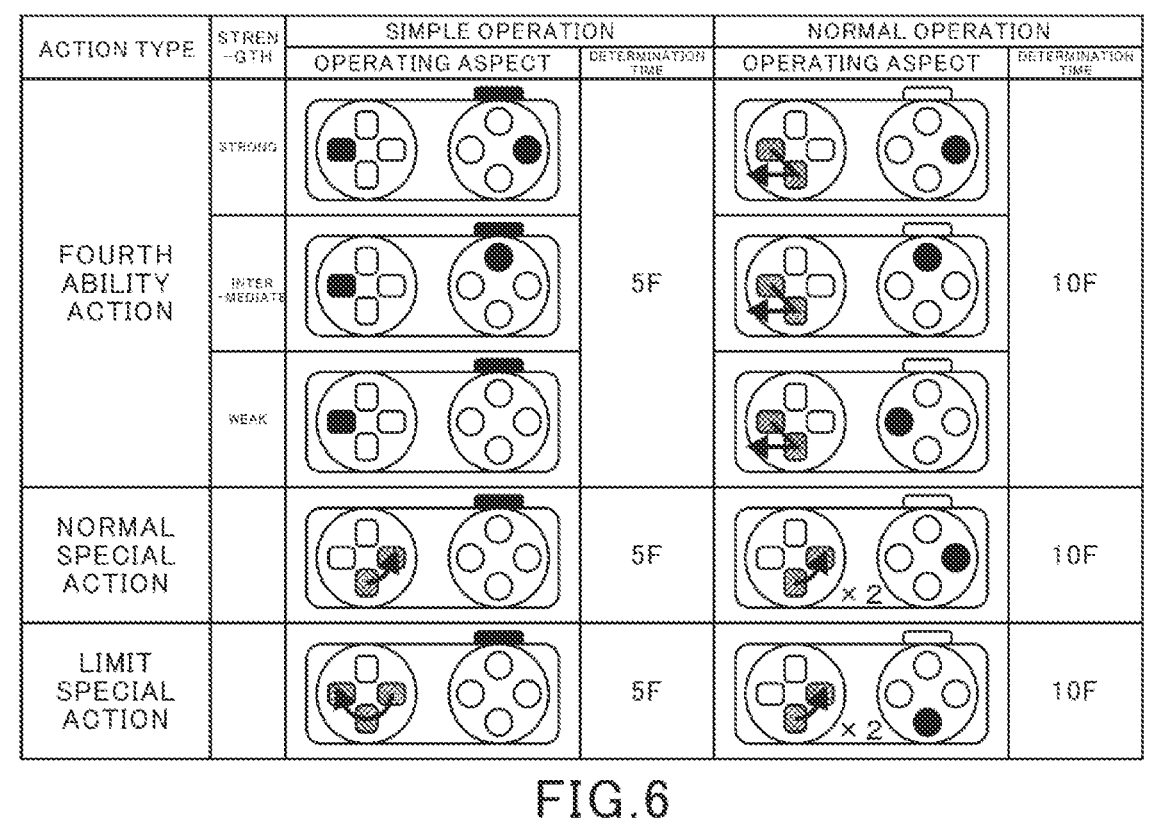

FIG. 5 is a first diagram for illustrating examples of the simple operation and the normal operation. FIG. 6 is a second diagram for illustrating examples of the simple operation and the normal operation. As described above, two types of operations, the simple operation and the normal operation, are associated with each of the ability actions. Each of the ability actions can be executed with one of three levels of strength selected from among "strong", "intermediate", and "weak".

The simple operation and the normal operation are each configured with the combination of a strength selection operation and an action selection operation. The operating aspects for the strength selection operation are common among all ability actions, but some of the operating aspects differ between the simple operation and the normal operation. More specifically, in the strength selection operation by means of the simple operation, the strength is set as "strong" with an operation of the first button 52a, and the strength is set as "intermediate" with an operation of the second button 52b. In addition, the strength is set as "weak" with no operation of (by not operating) the first button 52a, the second button 52b, the third button 52c, and the fourth button 52d.

On the other hand, in the strength selection operation by means of the normal operation, the strength is set as "strong" with an operation of the first button 52a, the strength is set as "intermediate" with an operation of the second button 52b, and the strength is set as "weak" with an operation of the third button 52c.

Also, the first ability action is associated with an operation of the simple button 56 as the action selection operation by means of the simple operation. Therefore, when the simple button 56 and the first button 52a are simultaneously operated, a first ability action with a strength of "strong" is executed. Similarly, a first ability action with a strength of "intermediate" is executed when the simple button 56 and the second button 52b are simultaneously operated, and a first ability action with a strength of "weak" is executed when only the simple button 56 is operated.

Note that a "simultaneous" operation as defined in the present description is not limited to cases where the timings completely coincide with each other but includes cases where the difference between operation input timings falls within a predetermined period of time. In other words, in the case where the action selection operation involves a series of operations, if the last operation of the series of operations and the strength selection operation are executed within a predetermined period of time, a desired ability action or a special action is executed.

In contrast, the first ability action is associated with the following series of operations as the action selection operation by means of the normal operation: executing an operation of the lower button 54d, a simultaneous operation of the lower button 54d and the right button 54a, and an operation of the right button 54a in that order. Also, when the first button 52a is operated simultaneously with the operation of the right button 54a, a first ability action with a strength of "strong" is executed, when the second button 52b is operated simultaneously with the operation of the right button 54a, a first ability action with a strength of "intermediate" is executed, and when the third button 52c is operated simultaneously with the operation of the right button 54a, a first ability action with a strength of "weak" is executed.

In addition, the second ability action is associated with executing a simultaneous operation of the simple button 56 and the right button 54a as the action selection operation by means of the simple operation. Therefore, when the simple button 56, the right button 54a, and the first button 52a are operated simultaneously, a second ability action with a strength of "strong" is executed. Similarly, when the simple button 56, the right button 54a, and the second button 52b are operated simultaneously, a second ability action with a strength of "intermediate" is executed. In addition, when only the simple button 56 and the right button 54a are operated simultaneously, a second ability action with a strength of "weak" is executed.

In contrast, the second ability action is associated with the following series of operations as the action selection operation by means of the normal operation: inputting an operation of the right button 54a, an operation of the lower button 54d, and a simultaneous operation of the right button 54a and the lower button 54d in that order. Also, when the first button 52a is operated at the same time as the simultaneous operation of the right button 54a and the lower button 54d, a second ability action with a strength of "strong" is executed, when the second button 52b is operated at the same time as the simultaneous operation of the right button 54a and the lower button 54d, a second ability action with a strength of "intermediate" is executed, and when the third button 52c is operated at the same time as the simultaneous operation of the right button 54a and the lower button 54d, a second ability action with a strength of "weak" is executed.

In addition, the third ability action is associated with executing a simultaneous operation of the simple button 56 and the lower button 54d as the action selection operation by means of the simple operation. Therefore, when the simple button 56, the lower button 54d, and the first button 52a are operated simultaneously, a third ability action with a strength of "strong" is executed. Similarly, when the simple button 56, the lower button 54d, and the second button 52b are operated simultaneously, a third ability action with a strength of "intermediate" is executed. In addition, when only the simple button 56 and the lower button 54d are operated simultaneously, a third ability action with a strength of "weak" is executed.

In contrast, the third ability action is associated with the following series of operations as the action selection operation by means of the normal operation: executing an operation of the lower button 54d, a simultaneous operation of the lower button 54d and the left button 54c, and an operation of the left button 54c in that order. Also, when the first button 52a is operated simultaneously with the operation of the left button 54c, a third ability action with a strength of "strong" is executed, when the second button 52b is operated simultaneously with the operation of the left button 54c, a third ability action with a strength of "intermediate" is executed, and when the third button 52c is operated simultaneously with the operation of the left button 54c, a third ability action with a strength of "weak" is executed.

In addition, as shown in FIG. 6, the fourth ability action is associated with executing a simultaneous operation of the simple button 56 and the left button 54c as the action selection operation by means of the simple operation. Therefore, when the simple button 56, the left button 54c, and the first button 52a are operated simultaneously, a fourth ability action with a strength of "strong" is executed. Similarly, when the simple button 56, the left button 54c, and the second button 52b are operated simultaneously, a fourth ability action with a strength of "intermediate" is executed. In addition, when only the simple button 56 and the left button 54c are operated simultaneously, a fourth ability action with a strength of "weak" is executed.

In contrast, the fourth ability action is associated with the following series of operations as the action selection operation by means of the normal operation: inputting an operation of the left button 54c, an operation of the lower button 54d, and a simultaneous operation of the left button 54c and the lower button 54d in that order. Also, when the first button 52a is operated at the same time as the simultaneous operation of the left button 54c and the lower button 54d, a fourth ability action with a strength of "strong" is executed, when the second button 52b is operated at the same time as the simultaneous operation of the left button 54c and the lower button 54d, a fourth ability action with a strength of "intermediate" is executed, and when the third button 52c is operated at the same time as the simultaneous operation of the left button 54c and the lower button 54d, a fourth ability action with a strength of "weak" is executed.

Furthermore, in this embodiment, two types of operations, a simple operation and a normal operation, are also associated with the special actions. It should be noted, however, that although the ability actions can be executed with a selected strength, no strength can be selected for the special actions. Therefore, there are 12 patterns provided for each of the simple operation and the normal operation in the case of the ability actions, as described above. However, each of the simple operation and the normal operation for the special actions has a total of only two patterns, one for the normal special action and the other for the limit special action.

Here, the normal special action is associated with the following series of operations as the simple operation: executing an operation of the lower button 54d, a simultaneous operation of the lower button 54d and the right button 54a, and a simultaneous operation of the right button 54a and the simple button 56 in that order. On the other hand, the normal special action is associated with the following series of operations as the normal operation: repeating twice the operation set of operating the lower button 54d, simultaneously operating the lower button 54d and the right button 54a, and operating the right button 54a in that order and then operating the first button 52a simultaneously with a last operation of the right button 54a.

In addition, the limit special action is associated with the following series of operations as the simple operation: executing an operation of the right button 54a, a simultaneous operation of the right button 54a and the lower button 54d, an operation of the lower button 54d, a simultaneous operation of the lower button 54d and the left button 54c, and a simultaneous operation of the left button 54c and the simple button 56 in that order. On the other hand, the limit special action is associated with the following series of operations as the normal operation: repeating twice the operation set of operating the lower button 54d, simultaneously operating the lower button 54d and the right button 54a, and operating the right button 54a in that order and then operating the fourth button 52d simultaneously with a last operation of the right button 54a.

As described above, the simple operation is smaller than the normal operation in either one or both of the number of operating sections that need to be operated and the total number of operations that need to be executed. Therefore, the determination time for determining that an operation is effective, i.e., the upper limit time for determining that an operation has been input, is set to be shorter for the simple operation than for the normal operation. Here, 5F (frames) as the determination time is set for all patterns of the simple operation, and 10F as the determination time is set for all patterns of the normal operation. Note that although there is no particular limitation to the number of times rendering is performed (number of frames) per second, it is assumed here that the number of frames per second is set as 60F as an example.

Thus, it is possible to determine that a simple operation has been input in the case where the simple operation is completed within a predetermined time (5F), and it is possible to determine that a normal operation has been input in the case where the normal operation is completed within a particular time (10F), which is longer than the predetermined time (5F). In addition, as described above, the simple operation requires no more than simultaneously operating all operating sections, whereas the normal operation requires not only operating a plurality of operating sections in a predetermined order but also simultaneously operating a plurality of operating sections finally.

Furthermore, as shown in FIG. 3A, each of the notification images suggests or indicates the operating aspect of the simple operation. For example, the second notification image 36a corresponds to the second ability action. As described above, the simple operation for the second ability action requires a simultaneous operation of the simple button 56 and the right button 54a as the action selection operation. A right-direction arrow suggesting the right button 54a is displayed on the second notification image 36a and suggests or indicates the simple operation for the second ability action.

Similarly, because the third notification image 38*a* corresponds to the third ability action that requires a simultaneous operation of the simple button 56 and the lower button 54*d*, an arrow indicating the down direction is displayed on the third notification image 38*a*. In addition, because the fourth notification image 40*a* corresponds to the fourth ability action that requires a simultaneous operation of the simple button 56 and the left button 54*c*, an arrow indicating the left direction is displayed on the fourth notification image 40*a*.

The player's operation input is more simplified for the simple operation than for the normal operation, and moreover, notification images suggesting or indicating the simple operation are displayed on the game screen 10*a*. Therefore, even beginners are able to easily execute ability actions and are thus more encouraged to play the game.

However, an easy operation for invoking ability actions and special actions results in a smaller technical gap among players, thereby discouraging players from improving techniques and playing the game. With this being the situation, the normal operation is provided besides the simple operation in this embodiment, so that the degree of disadvantage or the degree of advantage after the end of ability actions and special actions is made to differ between the case where those actions are executed via input of the simple operation and the case where those actions are executed via input of the normal operation.

FIG. 7 is a diagram for illustrating examples of restriction times. As described above, ability actions can be executed in the permitted state, and when an ability action is executed, the state is changed from the permitted state to the restricted state. At this time, a restriction time is set, and thereafter, the restricted state is maintained until the restriction time elapses. A restriction time is preset for each of the ability actions and furthermore for each of the operating aspects for executing the ability action.

For example, when a first ability action with a strength of "weak" is executed by inputting the simple operation, the restriction time is set as 60F. In contrast, in the case where a first ability action with a strength of "weak" is executed by inputting the normal operation, the restriction time is set as 20F. Similarly, in the case where first ability actions with strengths of "intermediate" and "strong" are executed, the restriction times are set as 70F and 600F, respectively, if the input operation is the simple operation, and the restriction times are set as 20F and 480F, respectively, if the input operation is the normal operation.

Thus, when the same ability action is executed, a shorter restriction time is set in the case where the normal operation is input than in the case where the simple operation is input. Therefore, the time until the same ability action is executed again can be reduced more by executing an ability action via the normal operation than by executing the ability action via the simple operation.

Note that although the restriction times set for each of the operation types differ between the first ability action and the second ability action in FIG. 7, common restriction times may be set for all ability actions. In addition, for example, a common restriction time may be set for the simple operation and the normal operation in the case where the strength is "weak" or "intermediate", and different restriction times may be set for the simple operation and the normal operation only in the case where the strength is "strong".

In addition, in this embodiment, when special actions are executed, all ability actions are placed into the restricted state. When special actions are executed by inputting the simple operation, the restriction time is set as 600F. In contrast, when special actions are executed by inputting the normal operation, the restriction time is set as 480F. The restriction times set for the simple operation for the special actions are identical to the longest of the restriction times set for the simple operation for the ability actions. Here, because the longest of the restriction times set for the simple operation for the ability actions is 600F, 600F is also set for the simple operation for the special actions as the restriction time.

Similarly, the restriction times set for the normal operation for the special actions are identical to the longest of the restriction times set for the normal operation for the ability actions. Here, because the longest of the restriction times set for the normal operation for the ability actions is 480F, 480F is also set for the normal operation for the special actions as the restriction time.

Thus, the restriction times for special actions are set as values equal to or greater than the restriction times for ability actions, thereby preventing an operation such as reducing the restriction time by executing a special action immediately after executing an ability action.

In addition, the restriction times shown in FIG. 7 are merely examples and can be set, as appropriate. It should be noted, however, that the player can be more strategic in the execution timing of each of the actions by setting a longer restriction time for actions with a great effect than for actions with a small effect (including ability actions and special actions) as in this embodiment.

Note that, in this embodiment, as shown in FIG. 7, the restriction times are common for the normal special action and the limit special action. However, the restriction times for the limit special action may be set to be longer or shorter than the restriction times for the normal special action.

In addition, here, the degree of disadvantage or the degree of advantage after the end of each of the actions is made to differ depending on how long the restricted state for restricting the execution of the ability action is maintained, i.e., the time until the ability action becomes executable again. More specifically, in a relatively disadvantageous state, the state is changed to the permitted state when a first time elapses in the restricted state, whereas, in a relatively advantageous state, the state is changed to the permitted state when a second time, which is shorter than the first time, elapses in the restricted state.

However, for example, in the case where the simple operation is input, hitting the opponent character with an attack three times may cause the state to change from the restricted state to the permitted state, and in the case where the normal operation is input, hitting the opponent character with an attack once may cause the state to change from the restricted state to the permitted state. In addition, for example, in the case where the simple operation is input, inflicting damage with a predetermined value on the opponent character may cause the state to change from the restricted state to the permitted state, and in the case where the normal operation is input, inflicting damage with a value smaller than the predetermined value on the opponent character may cause the state to change from the restricted state to the permitted state.

Anyway, it is a good idea to change the state from the restricted state to the permitted state in the case where: a first change condition is satisfied in the restricted state after an ability action is executed by inputting the simple operation; and a second change condition, which differs from the first change condition, is satisfied in the restricted state after an ability action is executed by inputting the normal operation.

At this time, it is also a good idea to set the second change condition to be more easily or earlier satisfied than the first change condition.

Furthermore, the degree of advantage after the end of an ability action is not limited to the duration of the restricted state or ease of state change to the permitted state. For example, the degree of advantage may differ in a matter irrelevant to the executed ability action, such as the invocation points of a special action not being updated over a predetermined time after the end of the ability action. Anyway, the specifics of the degree of disadvantage or the degree of advantage after the end of an ability action can be designed as appropriate, as long as those degrees differ between cases where the ability action is executed by inputting the simple operation and cases where the ability action is executed by inputting the normal operation.

(Explanation of Control Units in Game Device 1)

Control units in the game device 1 related to the above-described ability actions and special actions will be described below. Note that descriptions of configurations irrelevant to the ability actions and the special actions will be omitted below.

Figure 8:
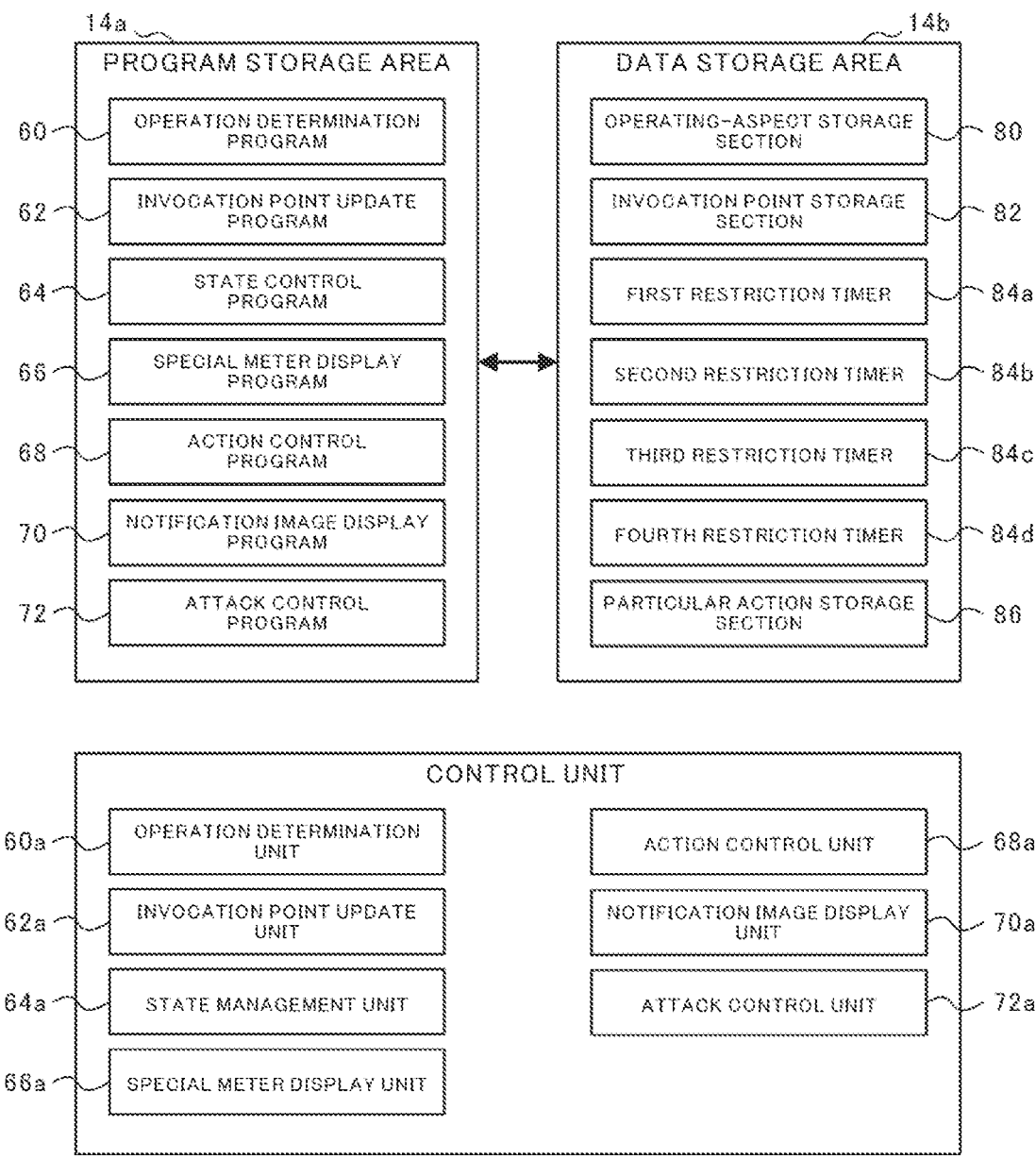
FIG. 8 is a diagram for illustrating the configuration of a memory in the game device and functions of a computer.

FIG. 8 is a diagram for illustrating the configuration of the memory 14 and functions of the computer in the game device 1. In the memory 14, a program storage area 14a and a data storage area 14b are provided. The CPU 12 stores, in the program storage area 14a, programs (modules) for a battle game when the battle game is started.

The programs for the battle game include: an operation determination program 60; an invocation point update program 62; a state control program 64; special meter display program 66; an action control program 68; a notification image display program 70; and an attack control program 72. Note that the programs listed in FIG. 8 are examples, and many other programs for the battle game are provided.

The data storage area 14b includes, as storage sections for storing data: an operating-aspect storage section 80; an invocation point storage section 82; a first restriction timer 84a; a second restriction timer 84b; a third restriction timer 84c; a fourth restriction timer 84d; and a particular action storage section 86. Note that the above-described storage sections are merely examples, and many other storage sections are provided in the data storage area 14b. In addition, the storage sections shown in FIG. 8 are provided for each of the player character Pa and the player character Pb.

The CPU 12 runs the programs stored in the program storage area 14a and updates data in the storage sections of the data storage area 14b. Also, by running the programs stored in the program storage area 14a, the CPU 12 causes the game device (computer) to function as control units.

More specifically, the CPU 12 runs the operation determination program 60 and causes the computer to function as an operation determination unit 60a. Similarly, the CPU 12 runs the invocation point update program 62, the state control program 64, the special meter display program 66, the action control program 68, the notification image display program 70, and the attack control program 72 and causes the computer to function as an invocation point update unit 62a, a state management unit 64a, a special meter display unit 66a, an action control unit 68a, a notification image display unit 70a, and an attack control unit 72a, respectively.

(Explanation of Battle Game Control Processes)

Next, processes executed by the above-described control units will be described. Note that descriptions of processes related to the ability actions and special actions will be given below, and descriptions of other processes will be omitted.

Figure 9:
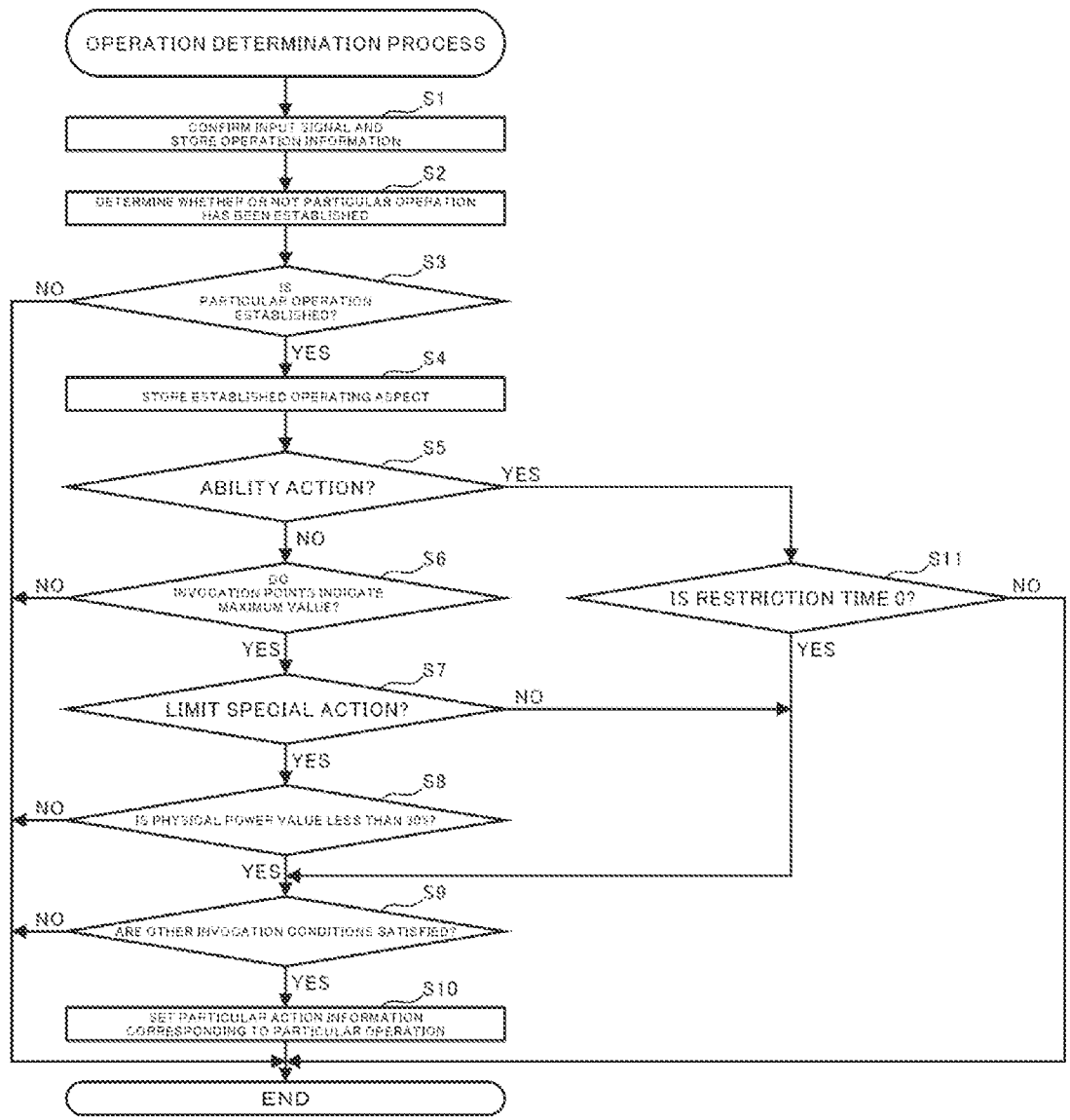
FIG. 9 is a flowchart showing an example of an operation determination process.

FIG. 9 is a flowchart showing an example of an operation determination process. Each of the processes in the game device 1 is executed at image update intervals on the display 10. As described above, the reciprocal of the image update interval, i.e., the number of frames per second is, for example, 60F/s, and hence each of the following processes is executed 60 times per second. Note that the number of frames is merely an example and can be designed, as appropriate.

The operation determination unit 60a confirms an input signal from the controller 50 and stores operation information indicating what operating section has been operated (S1). Then, the operation determination unit 60a determines whether or not a particular operation has been established on the basis of the operation information stored in S1 and the operation information stored within the most recent predetermined time (e.g., 10F) (S2). Note that the term particular operation collectively refers to the normal operation and the simple operation corresponding to ability actions and special actions. Here, whether or not the simple operation has been established is determined on the basis of the operation information within 5F, and whether or not the normal operation has been established is determined on the basis of the operation information within 10F.

When a particular operation is established (YES in S3), the operation determination unit 60a stores the established operating aspect in the operating-aspect storage section 80 (S4). In the case where the stored operating aspect does not correspond to an ability action (NO in S5) and the invocation points indicate the maximum value (YES in S6), the operation determination unit 60a determines whether or not the particular operation corresponds to the limit special action (S7). Then, in the case where it is determined that the particular operation corresponds to the limit special action (YES in S7), if the physical power value of the player's own character is less than 30% (YES in S8) and the other invocation conditions are satisfied (YES in S9), particular action information (here, limit special action) corresponding to the operating aspect (particular operation) stored in the operating-aspect storage section 80 in S4 is set in the particular action storage section 86 (S10).

Note that the term particular action collectively refers to ability actions and special actions, and particular action information is information for allowing ability actions and special actions to be identified. In a particular action control process, which will be described later, the action control unit 68a executes the particular action on the basis of the particular action information stored in the particular action storage section 86.

In addition, examples of the above-described "other invocation conditions" include: the player's own character not being in a stiffened state (state after the start of an attack action or an ability action executed by the player's own character until the completion of the action); the player's own character not being in a locked state (state in which the player's own character cannot take an action as a result of being attacked by the opponent character); the timer not indicating that time is up; no predetermined rendering being in progress; and the battle game not being settled.

In addition, in the case where it is determined that the particular operation does not correspond to the limit special action (NO in S7), i.e., in the case where the particular operation corresponds to the normal special action, if the other invocation conditions are satisfied (YES in S9), particular action information (here, normal special action) corresponding to the operating aspect (particular operation)

stored in the operating-aspect storage section 80 in S4 is set in the particular action storage section 86 (S10).

In addition, in the case where the stored operating aspect corresponds to an ability action (NO in S5), the operation determination unit 60a determines whether or not the timer value (restriction time) of the restriction timer (one of the first restriction timer 84a to the fourth restriction timer 84d) corresponding to the ability action is 0 (S11). At this time, if the timer value (restriction time) is 0 (YES in S11) and the other invocation conditions are satisfied (YES in S9), particular action information (here, one of the ability actions) corresponding to the particular operation is set in the particular action storage section 86 (S10).

Figure 10:
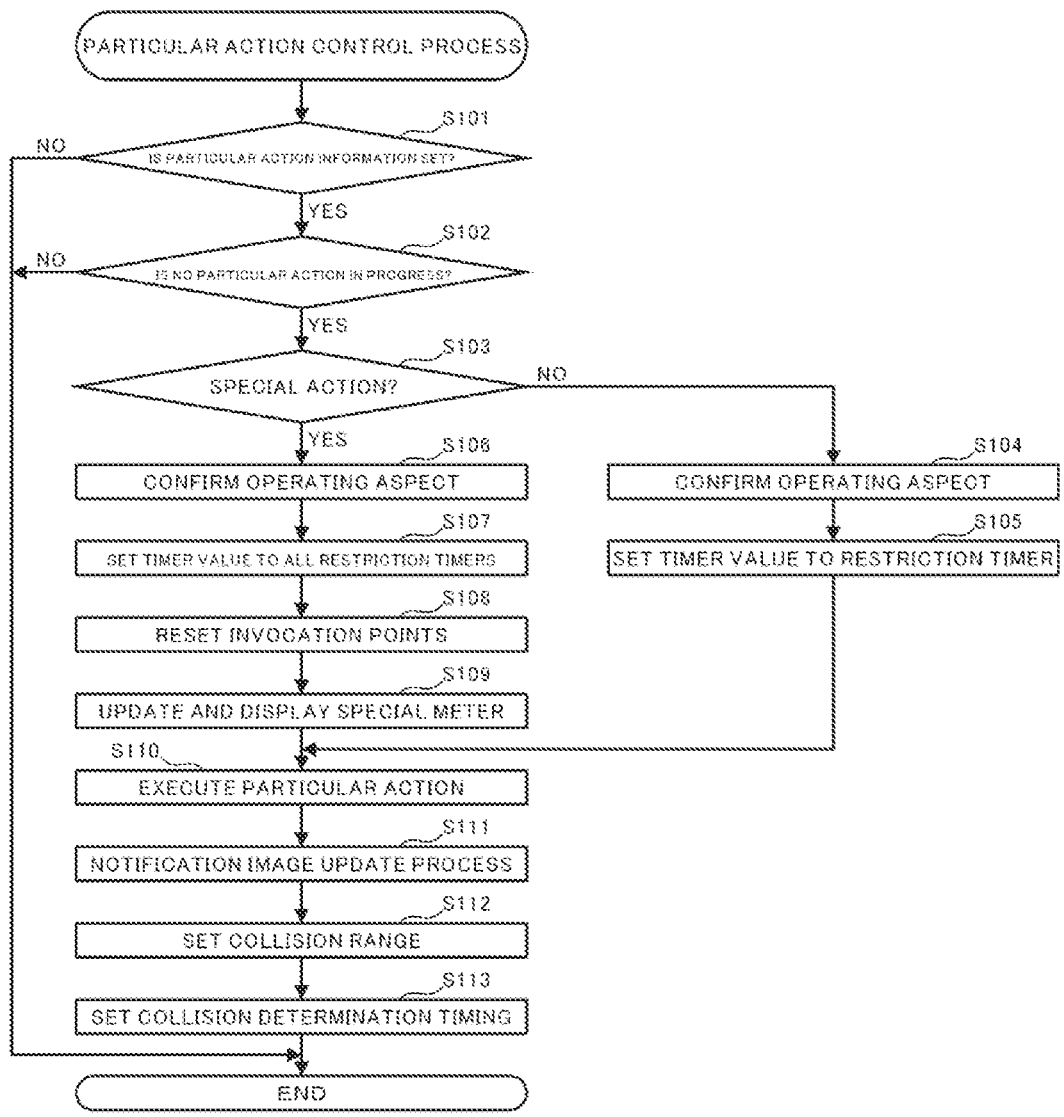
FIG. 10 is a flowchart showing an example of a particular action control process.

FIG. 10 is a flowchart showing an example of the particular action control process. In the case where particular action information is set in the particular action storage section 86 (YES in S101) and no particular action is in progress (YES in S102), the action control unit 68a determines whether or not the particular action information stored in the particular action storage section 86 is information corresponding to a special action (S103). In the case where particular action information corresponding to a special action is not stored, i.e., in the case where particular action information corresponding to any one of the ability actions is stored (NO in S103), the state management unit 64a confirms the operating aspect stored in the operating-aspect storage section 80 (S104).

The state management unit 64a sets the timer value (restriction time) corresponding to the operating aspect stored in the operating-aspect storage section 80 in the restriction timer corresponding to the ability action to be executed (S105). Here, a shorter time is set for the restriction time in the case where the operating aspect corresponds to the normal operation than in the case where the operating aspect corresponds to the simple operation. In addition, here, as a result of a timer value being set in the restriction timer, the system enters the restricted state in which execution of an ability action is restricted.

In addition, in the case where particular action information corresponding to a special action is stored (YES in S103), the state management unit 64a confirms the operating aspect stored in the operating-aspect storage section 80 (S106) and sets the timer value (restriction time) corresponding to the stored operating aspect in all restriction timers of the player's own character (S107). Here, the timer value (restriction time) corresponding to the special action is set.

In addition, the invocation point update unit 62a resets (sets to 0) the invocation points stored in the invocation point storage section 82 (S108). In addition, the special meter display unit 66a updates and displays (resets) the meter value of the special meter 32a (32b) (S109).

The action control unit 68a executes the processes for executing the particular action (special action, ability action) on the basis of the particular action information stored in the particular action storage section 86 (S110). Here, the action control unit 68a executes the processes related to animation display for each particular action.

In addition, the notification image display unit 70a executes a notification image update process for displaying a darkened portion according to the timer value set in the restriction timer (S111). In addition, the attack control unit 72a sets the collision range (S112) and furthermore sets a collision determination timing for making a collision determination (S113). Although not described in detail, it is determined whether or not hitting with an attack is successful on the basis of the collision range and the collision determination timing that have been set here.

Figure 11:
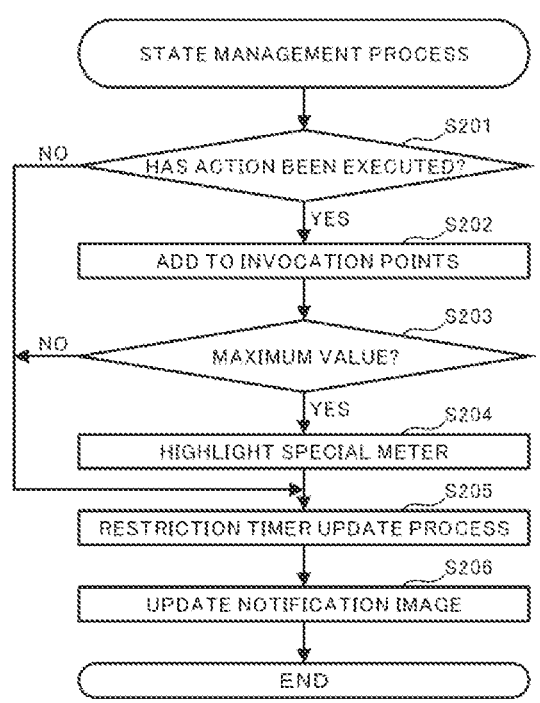
FIG. 11 is a flowchart showing an example of a state management process.

FIG. 11 is a flowchart showing an example of a state management process. When an action of a player character P is executed (YES in S201), the invocation point update unit 62a adds an additional value corresponding to the executed action to the invocation points stored in the invocation point storage section 82 (S202). Then, when the invocation points reach the maximum value (YES in S203), the special meter display unit 66a highlights the special meter 32a (32b) (S204).

In addition, the state management unit 64a confirms the timer values of all restriction timers and executes a restriction timer update process for subtracting from the timer values regarding the restriction timers the timer values of which are not 0 (S205). At this time, as a result of the timer values being 0 by subtracting from the timer values, the state is changed from the restricted state to the permitted state.

The notification image display unit 70a updates the notification images on the basis of the timer values updated in S205 (S206). Through this process, the darkened portions of the notification images are progressively reduced as the restriction times elapse.

Although an aspect of an embodiment has been described with reference to the accompanying drawings, it goes without saying that the present invention is not limited to the embodiments described above. It would be obvious that a person skilled in the art could conceive of various modifications and amendments within the scope recited in the claims, and it will be understood that those modifications and amendments obviously belong to the technical scope of the present invention.

The control processes indicated in the above-described embodiments are merely examples. In the above-described embodiments, the control processes for executing a battle game are executed in the game device 1. However, the control processes for executing a battle game may be executed concurrently by, for example, the game device 1 and the server 2. In short, the information processing system S, which is a client-server system, may execute each of the above-described control processes. For example, in the case where an online battle is executed, the processes shown in FIGS. 9 to 11 may be executed by either of the game device 1 and the server 2.

Furthermore, in the above-described embodiments, the programs for realizing a battle game may be stored in a computer-readable storage medium. Alternatively, the above-described embodiments may be embodied as information processing methods for realizing the functions and the steps shown in the flowcharts.

What is claimed is:

1. A non-transitory computer readable medium storing a program causing a computer to perform a method comprising:

determining a first operation that is input to a game controller;

causing a target object to execute a particular action in response to determining that a first type of operation is input based on the first operation that is input to the game controller and in response to determining that a second operation that differs from the first operation is input to the game controller;

causing a degree of disadvantage or a degree of advantage after an end of the particular action is performed that differs between the particular action being executed as a first result of the first type of operation being input to the game controller and the particular action being executed as a second result of the second operation being input to the game controller,
wherein the particular action is executed in response to determining that the first operation or the second operation is input to the game controller in a permitted state;
changing a state from the permitted state to a restricted state in response to determining that the particular action is executed;
determining that a first change condition is satisfied in the restricted state after the particular action is executed based on the first operation being input and in response to a second change condition that is satisfied earlier than the first change condition is satisfied in the restricted state after the particular action is executed based on the second operation being input; and
changing the state from the restricted state to the permitted state in response to the first change condition being satisfied and the second change condition being satisfied earlier in the restricted state than the first change condition.

2. The non-transitory computer readable medium according to claim 1,
wherein the state is changed to the permitted state by determining that the first change condition is satisfied when a first time elapses in the restricted state, and
wherein the state is changed to the permitted state by determining that the second change condition is satisfied when a second time that is shorter than the first time elapses in the restricted state.

3. The non-transitory computer readable medium according to claim 2, wherein the first operation is smaller than the second operation in either one or both of the number of operating sections that need to be operated and the total number of operations that need to be executed.

4. The non-transitory computer readable medium according to claim 3, wherein the program further causes the computer to execute: displaying a notification image that suggests or indicates the first operation among the first operation and the second operation.

5. The non-transitory computer readable medium according to claim 2, wherein the program further causes the computer to execute: displaying a notification image that suggests or indicates the first operation among the first operation and the second operation.

6. The non-transitory computer readable medium according to claim 1, wherein the first operation is smaller than the second operation in either one or both of the number of operating sections that need to be operated and the total number of operations that need to be executed.

7. The non-transitory computer readable medium according to claim 6, wherein the program further causes the computer to execute: displaying a notification image that suggests or indicates the first operation among the first operation and the second operation.

8. The non-transitory computer readable medium according to claim 1, wherein the program further causes the computer to execute: displaying a notification image that suggests or indicates the first operation among the first operation and the second operation.

9. An information processing method comprising:
determining a first operation that is input to a game controller;
causing a target object to execute a particular action in response to determining that a first type of operation is input based on the first operation that is input to the game controller and in response to determining that a second operation that differs from the first operation is input to the game controller; and
causing a degree of disadvantage or a degree of advantage after an end of the particular action is performed that differs between the particular action being executed as a first result of the first type of operation being input to the game controller and the particular action being executed as a second result of the second operation being input to the game controller,
wherein the particular action is executed in response to determining that the first operation or the second operation is input to the game controller in a permitted state;
changing a state from the permitted state to a restricted state in response to determining that the particular action is executed;
determining that a first change condition is satisfied in the restricted state after the particular action is executed based on the first operation being input and in response to a second change condition that is satisfied earlier than the first change condition is satisfied in the restricted state after the particular action is executed based on the second operation being input; and
changing the state from the restricted state to the permitted state in response to the first change condition being satisfied and the second change condition being satisfied earlier in the restricted state than the first change condition.

10. A game device comprising a computer configured to execute a method comprising:
determining a first operation that is input to a game controller;
causing a target object to execute a particular action in response to determining that a first type of operation is input based on the first operation that is input to the game controller and in response to determining that a second operation that differs from the first operation is input to the game controller; and
causing a degree of disadvantage or a degree of advantage after an end of the particular action is performed that differs between the particular action being executed as a first result of the first type of operation being input to the game controller and the particular action being executed as a second result of the second operation being input to the game controller,
wherein the particular action is executed in response to determining that the first operation or the second operation is input to the game controller in a permitted state;
changing a state from the permitted state to a restricted state in response to determining that the particular action is executed;
determining that a first change condition is satisfied in the restricted state after the particular action is executed based on the first operation being input and in response to a second change condition that is satisfied earlier than the first change condition is satisfied in the restricted state after the particular action is executed based on the second operation being input; and
changing the state from the restricted state to the permitted state in response to the first change condition being satisfied and the second change condition being satisfied earlier in the restricted state than the first change condition.

\* \* \* \* \*